United States Patent
Muhanna et al.

(10) Patent No.: US 8,477,729 B2
(45) Date of Patent: Jul. 2, 2013

(54) SUPPORT FOR MULTI-HOMING PROTOCOLS USING TRANSIENT REGISTRATION AND EXPANDED BINDING REVOCATION MESSAGES

(75) Inventors: Ahmad Muhanna, Richardson, TX (US); Barnaba Barnowski, Calgary (CA); Mohamed Khalil, Murphy, TX (US)

(73) Assignee: Research In Motion Limited, Ontario (CA)

( * ) Notice: Subject to any disclaimer, the term of this patent is extended or adjusted under 35 U.S.C. 154(b) by 403 days.

(21) Appl. No.: 12/922,933

(22) PCT Filed: Mar. 19, 2009

(86) PCT No.: PCT/US2009/001738
§ 371 (c)(1),
(2), (4) Date: Sep. 16, 2010

(87) PCT Pub. No.: WO2009/117126
PCT Pub. Date: Sep. 24, 2009

(65) Prior Publication Data
US 2011/0007711 A1      Jan. 13, 2011

Related U.S. Application Data

(60) Provisional application No. 61/037,840, filed on Mar. 19, 2008.

(51) Int. Cl.
*H04W 4/00* (2009.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| 7,139,833 | B2 * | 11/2006 | Heller | 709/238 |
|---|---|---|---|---|
| 2005/0128969 | A1 | 6/2005 | Lee et al. | |
| 2008/0043674 | A1 * | 2/2008 | Suh et al. | 370/331 |
| 2008/0207168 | A1 * | 8/2008 | Forsberg | 455/411 |
| 2008/0311909 | A1 * | 12/2008 | Taaghol et al. | 455/436 |
| 2009/0094693 | A1 * | 4/2009 | Patil | 726/12 |

OTHER PUBLICATIONS

International Searching Authority: Notification of Transmittal of the International Search Report, Written Opinion of Int'l Searching Authority, or the Declaration dated Jun. 4, 2009.
International Searching Authority: Written Opinion of the International Searching Authority dated Jun. 4, 2009.
International Searching Authority: International Search Report dated Jun. 4, 2009.

* cited by examiner

*Primary Examiner* — Eunsook Choi

(57) ABSTRACT

The present invention solves these problems with a new proxy binding update request and proxy binding acknowledgement messages having new indicators and identification information. Namely, the home agent/local mobility anchor will exchange proxy binding update messages and proxy binding acknowledge messages that include information such as mobile node identification (MN-ID), home network prefix (HNP), but can also include selective information fields such as, access type, handover indicator (HO), and interface identification (interface ID). By including new access type, indicator, and identification information, the local mobility anchor can respond to a binding update request message with a better understanding of the new connectivity request from the mobile node. The invention also includes a binding revocation message with expanded trigger field information sent from the local mobility anchor to the mobile access gateways.

20 Claims, 3 Drawing Sheets

| MN - ID | AT | INT - ID |
|---|---|---|
|  |  |  |
|  |  |  |
|  |  |  |
|  |  |  |
|  |  |  |

SUPPORT FOR MULTI-HOMING PROTOCOLS USING TRANSIENT REGISTRATION AND EXPANDED BINDING REVOCATION MESSAGES

RELATED APPLICATION DATA

This application is related to Provisional Patent Application Ser. No. 61/037,840 filed on Mar. 19, 2008, and priority is claimed for this earlier filing under 35 U.S.C. §119(e). The Provisional Patent Application is also incorporated by reference into this utility patent application.

TECHNICAL FIELD OF THE INVENTION

A method for allocating addressing for a mobile node on a communication system using transient registration messages and expanded binding revocation indication messages.

BACKGROUND OF THE INVENTION

IP-based mobile systems provide for communication between at least one mobile node and a wireless communication network. The term "mobile node" includes a mobile communication unit (e.g., mobile terminal, "smart phones", nomadic devices such as laptop PCs with wireless connectivity, as described in greater detail below). Among other elements, the wireless communication system includes a home network and a foreign network. The mobile node may change its point of attachment to the Internet through these networks, but the mobile node will always be associated with a single home network for IP addressing purposes. The home network includes a home agent and the foreign network includes a foreign agent—both of which control the routing of information packets into and out of their network.

The mobile node, home agent and foreign agent may be called different names depending on the nomenclature used on any particular network configuration or communication system. For instance, a "mobile node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. Mobile nodes are sometimes called a user equipment, mobile unit, mobile terminal, mobile device, or similar names depending on the nomenclature adopted by particular system providers. Generally, there is also a correspondence node, which may be mobile or fixed, that may be located on the network for communicating with the mobile node.

A home agent may also be referred to as a Local Mobility Anchor, Home Mobility Manager, Home Location Register, and a foreign agent may be referred to as a Mobile Access Gateway, Serving Mobility Manager, Visited Location Register, and Visiting Serving Entity. The terms mobile node, home agent and foreign agent are not meant to be restrictively defined, but could include other mobile communication units or supervisory routing devices located on the home or foreign networks. Foreign networks can also be called serving networks.

Registering The Mobile Node

Foreign agents and home agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a home agent, a foreign agent, etc.) to a mobile node. Mobile nodes examine the agent advertisement and determine whether they are connected to the home network or a foreign network.

The mobile node will always be associated with its home network and sub-network for IP addressing purposes and will have information routed to it by routers located on the home and foreign network. If the mobile node is located on its home network, information packets will be routed to the mobile node according to the standard addressing and routing scheme. If the mobile node is visiting a foreign network, however, the mobile node obtains appropriate information from the agent advertisement, and transmits a registration request message (sometimes called a binding update request) to its home agent through the foreign agent. The registration request message will include a care-of address for the mobile node. A registration reply message (also called a binding update acknowledge message) may be sent to the mobile node by the home agent to confirm that the registration process has been successfully completed.

The mobile node keeps the home agent informed as to its location on foreign networks by registering a "care-of address" with the home agent. The registered care-of address identifies the foreign network where the mobile node is located, and the home agent uses this registered care-of address to forward information packets to the foreign network for subsequent transfer onto the mobile node. If the home agent receives an information packet addressed to the mobile node while the mobile node is located on a foreign network, the home agent will transmit the information packet to the mobile node's current location on the foreign network using the applicable care-of address. That is, this information packet containing the care-of address will then be forwarded and routed to the mobile node on the foreign network by a router on the foreign network according to the care-of address.

When mobile nodes move from one foreign network to another foreign network, problems are sometimes encountered with the registration of the care of addressing with the home agent or local mobility anchor. Further, multiple interfaces may be supported on a single or multiple foreign networks, which can include the different communication access types 802.11d, 802.11g, HRPD, WiFi, WiMax, CDMA, or LTE. Problems can be encountered when the mobile node becomes coupled to different access types on a single or multiple networks. Lastly, problems arise with a hand-off procedures regarding the optimization of the resource usage on the network by the local mobility anchor and the mobility agent gateway, including the problems associated with the determination by the mobility agent gateway (or foreign agent) to reject resource revocation request and the determination of which network resources to maintain, revoke or temporarily hold for predetermined periods of time.

Thus, it is a primary objective of this invention to provide addressing support for a mobile node where there is a handover to a new foreign network, a handover to a second access type on the same foreign network (multiple access types are supported on the foreign network), and/or multiple interfaces are supported for connecting a mobile node to a foreign network. Further, it is primary objective of this invention to provide sufficient information from the local mobility agent so the mobility agent gateway (or foreign agent) can optimize the resource usage on the network, including sufficient information to determine when to reject resource revocation requests and to determine which network resources to maintain, revoke or temporarily hold for predetermined periods of time.

SUMMARY OF THE INVENTION

The present invention solves these problems with a new proxy binding update request and proxy binding acknowledgement messages having new indicators and identification information, as well as expanded binding revocation trigger messages with additional information provided by the local mobility anchor and used by the mobility agent gateway (or foreign agent) to optimize the resource usage on the network.

Namely, the home agent/local mobility anchor will exchange proxy binding update messages and proxy binding acknowledge messages that include information such as mobile node identification (MN-ID), home network prefix (HNP), but can also include selective information fields such as, access type, handover indicator (HO), and interface identification (interface ID). By including new access type, indicator, and identification information, the local mobility anchor can respond to a binding update request message with a better understanding of the new connectivity request from the mobile node. The proxy binding update request and acknowledgement messages may require new fields or expanded fields for the transmission of the additional information, and the local mobility anchor/home agent will also need to expand its binding cache entry table to support these new information fields.

Further, the expanded binding revocation trigger message sent by the local mobility anchor to the mobility agent gateway (or foreign agent) will include detailed information that the mobility agent gateway can use to determine when to reject the resource revocation request or to determine whether to revoke, maintain, or temporarily hold resources on the network for a predetermined period of time. The present invention can be implemented using a new protocol application or modified messages from prior registration applications.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like element.

DETAILED DESCRIPTION OF THE PREFERRED EMBODIMENTS

Figures 1, 2:
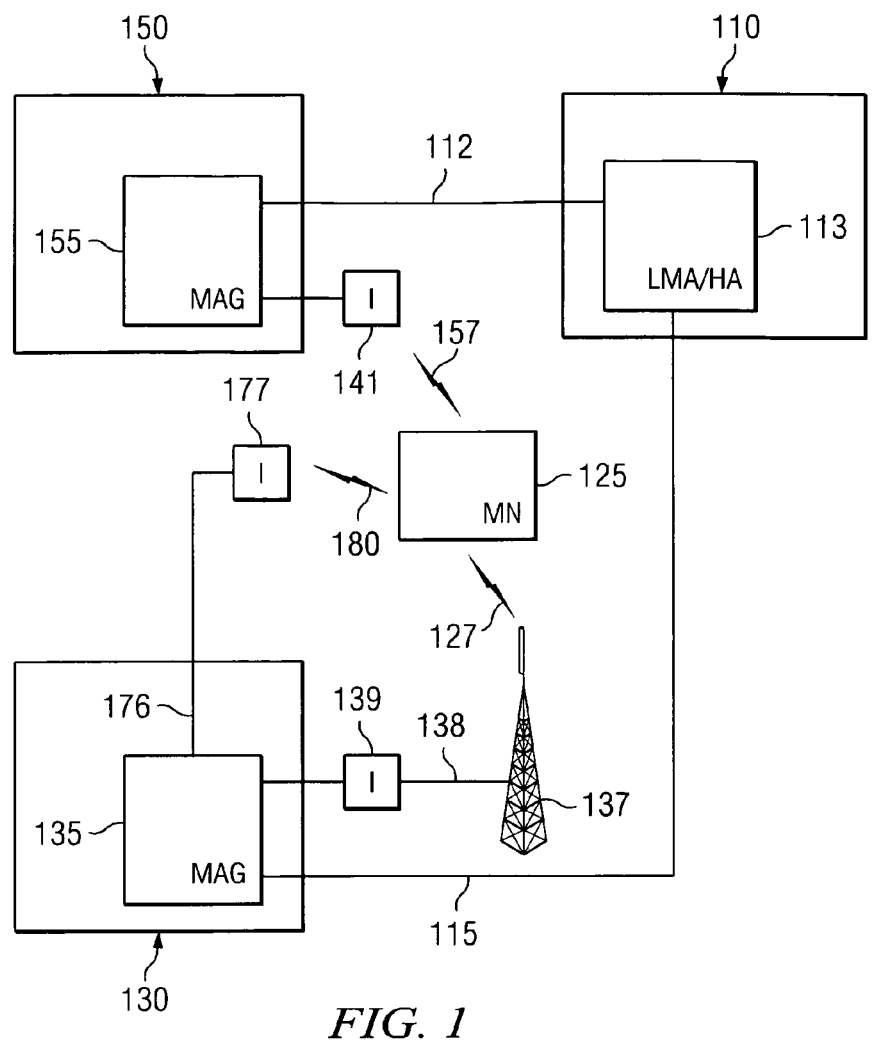
FIG. 1 is a mobile IP-based communication system as used in the present invention using proxy messages that specify access type fields.
FIG. 2 is a binding cache entry table that supports these entries for the system shown in FIG. 1.

In FIG. 1, the overall architecture of the IP-based mobile system is shown with a mobile mode 125, a home network 110 and foreign networks 130 and 150, respectively. As shown in FIG. 1, the home network 110 has a home agent or local mobility anchor 113. The local mobility anchor 113 is coupled to the mobility agent gateway 155 on foreign network 150 by communication link 112, and local mobility anchor 113 is coupled to the mobility agent gateway 135 on foreign network 130 by communication link 115.

The mobility agent gateway 135 is coupled to the mobile node 125 through the radio access system comprised of the base station transceiver 139 coupled to the antenna/transmitter 137 through the wireless communication link 127. The mobility agent gateway 155 is coupled the mobile node 125 using a second communication access type, such as WiMax or WiFi, which is supported by the interface 141 and wireless communication link 157.

FIG. 1 also shows a connection to mobile node 125 from the foreign agent 135 through connection 176 and second access interface 177. This interface is connected to mobile node 125 through wireless communication link 180. In this embodiment, the communication access type supported by connection interface 177 is the same as the second communication access type supported by interface 141. This embodiment has a limitation that multiple interfaces may be supported on the networks, but on any given foreign network (such as network 150 or 130), only one interface will be supported for each communication access type.

Mobile node 125 is shown electronically coupled to the foreign networks 150 and 130 via the wireless communication link 157 and 127, respectively. The mobile node 125, however, can communicate with any transceiver or access network coupled to a foreign network. That is, communications links 127 and 157 are radio transmitted links, but these links can be composed of any connection between two or more nodes on a network or users on networks or administrative domains.

The terms Local Mobility Anchor, home agent, and foreign agent may be as defined in the Mobile IP Protocol (RFC 2002), but these agents are not restricted to a single protocol or system. In fact, the term home agent, as used in this application, can refer to a home mobility manager, home location register, home serving entity, or any other agent at a home network 110 having the responsibility to manage mobility-related functionality for a mobile node 125. Likewise, the term mobility agent gateway, as used in this application, can refer to a foreign agent, serving mobility manager, visited location register, visiting serving entity, or any other agent on a foreign network having the responsibility to manage mobility-related functionality for a mobile node 125.

In the mobile IP communications system shown in FIG. 1, the mobile node 125 is identified by a permanent IP address. While the mobile node 125 is coupled to its home network 110, the mobile node 125 receives information packets like any other fixed node on the home network 110. When mobile, the mobile node 125 can also locate itself on foreign network, such as network 130 or 150. When located on foreign network 130 or 150, the home network 110 sends data communications to the mobile node 125 by "tunneling" the communications to the foreign network 130 or 150.

The mobile node 125 keeps the local mobility anchor 113 informed of its current location, or foreign network association, by registering a care-of address with the local mobility anchor 113. Essentially, the care-of address represents the foreign network where the mobile node 125 is currently located. If the local mobility anchor 113 receives an information packet addressed to the mobile node 125 while the mobile node 125 is located on a foreign network 130, the local mobility anchor 113 will "tunnel" the information packet to foreign network 130 for subsequent transmission to mobile node 125.

The foreign agent 135 participates in informing the local mobility anchor 113 of the mobile node 125 current care-of address. The foreign agent 135 also receives information packets for the mobile node 125 after the information packets have been forwarded to the foreign agent 135 by the local mobility anchor 113. Moreover, the foreign agent 135 serves as a default router for out-going information packets generated by the mobile node 125 while connected to the foreign network 130.

The mobile node 125 participates in informing the local mobility anchor 113 of its current location and requests connections to the associated foreign network. When the mobile node 125 transitions to connecting to a different access type on the foreign network or a wholly different foreign network (handover), the mobile node 125 obtains appropriate information regarding the address of the foreign network and/or the foreign agent from an agent advertisement.

When first connected to the local mobility anchor 113, mobile node 125 would have created an entry on the binding cache entry table in FIG. 2 that specified the mobile node identification for the mobile node 125. The access type field of information is included in the proxy binding update request and the binding cache entry table in FIG. 2, with the mobile node identification field. FIG. 2 is a binding cache entry table 160 that possesses at least column and row entries for the mobile node identification 165 and the access type 167. Other fields are maintained on the binding cache entry table, but these are the pertinent entries for the consideration of the present invention.

Because each access type on the networks shown on FIG. 1 are limited to a single interface from each foreign network, the local mobility anchor will check subsequent proxy binding update requests received from the mobile node 125 to determine if this proxy binding update request has the same access type indicator as previously maintained on the binding cache entry table 160 for that mobile node 125. If the same access type indicator is found in a proxy binding update request as previously maintained on the binding cache entry table 160 for that mobile node 125, the local mobility anchor 113 will recognize the situation as a handover of the mobile node 125 to a new foreign network, such as a handover of mobile node 125 from foreign network 130 to foreign network 150.

The local mobility anchor 113 will create a new binding cache entry for the mobile node, and the care-of addressing and home network prefix will be changed to designate the new foreign network as the network where the mobile node 125 can be located, which information will be transmitted to the proper mobility access gateway 135 and the mobile node 125. If the comparison with the information in the proxy binding update request shows a different access type connection for the mobile node 125, the local mobility anchor will determine if the home network prefix should designate the foreign network where the mobile node 125 was previously located without any indication of a handover to a new foreign network. If that is the case, the entry for the mobile node 125 will be modified on the binding cache entry table to indicate that the mobile node 125 is still connected to the first foreign network 130, which information will be transmitted to the proper mobility access gateway 135 and the mobile node 125.

That is, this comparison may simple show the new connection for the mobile node 125 is to a new access type, as opposed to a handover to a new foreign network. If so, the local mobility anchor 113 will respond to the proxy binding update request with a proxy binding update response having a home network prefix indicator that points to the first foreign network 130. In this manner, a receipt of new proxy binding update request at the local mobility anchor 113 does not automatically create a new home network prefix for this mobile node, which solves some of the problems with determining when a mobile node is simply connecting to a new access type on the same network or being handed over to a new foreign network.

If the hand-over is completed for the mobile node 125 to the new foreign network 150 and foreign agent 155, a regular proxy binding update request message is sent to the local mobility anchor 113. The local mobility anchor 113 updates its binding cache entry tables shown in FIG. 2 to indicate that the mobile node is currently attached to the new foreign network 150 and foreign agent 155. The indication on the cache entry table is that traffic correspondence with the mobile node 125 is bidirectional. The local mobility anchor 113 sends the new foreign agent 155 a proxy binding acknowledgement that confirms the receipt of the handover request, and the local mobility anchor deletes the information in the cache entry table relating to the former foreign network 130 and foreign agent 135 that provided connectivity support to the mobile node 125.

The local mobility anchor also sends a proxy binding revocation message to the former foreign agent 135 on foreign network 130 with expanded trigger field information. The proxy binding revocation message instructs the foreign agent 135 to revoke network resources previously dedicated to support the connectivity from the foreign agent 135 to the mobile node 125. As part of the present invention, the expanded trigger field information provides explanation information to the foreign agent 135 so the foreign agent 135 can determine whether it is appropriate to accept or reject the revocation request, and if so what resources need to be revoke, when these resources need to be revoked, and how the resources are revoked.

First, the foreign agent 135 will determine if the mobile node is still connected to foreign network 130, and if so, the foreign agent will respond to the revocation request with a rejection response to the local mobility anchor 113. Other conditions may also prompt a rejection response by the foreign agent 135. After receipt of the binding revocation request with expanded trigger information and after confirmation that it is proper to revoke resources previously dedicated to the mobile node 125, the foreign agent 135 will analyze the expanded trigger information to determine what network resources need to be revoked immediately, maintained for a predetermined period of time, or maintained indefinitely. The expanded trigger information in the proxy binding revocation request can be set to the following conditions, which includes information useful for the foreign agent 135 to perform its revocation of resources.

1 Unspecified
2 Administrative Reason
3 Inter-MAG Handoff—same Access Types
4 Inter-MAG Handoff—different Access Types
5 Inter-MAG—Unknown Handoff
6 Per-Peer Policy
7 Revoking Node Local Policy
8 User Initiated Session(s) Termination
9 Access Network Session(s) Termination
10 IPv4 HoA Lease Expires 11 Possible Out-of Sync BCE State
250-255 Reserved For Testing Purposes only These conditions and expanded trigger information found in the revocation request are used by the foreign agent to optimize the revocation of resources supported on the foreign network 130. Condition 1 is unspecified and will provide the foreign agent 135 with sufficient information to revoke resources in an "unspecified" handover or default procedure. Condition 2 indicates to the foreign agent 135 that the cause of the revocation request from the local mobility anchor 113 to the foreign agent 135 is for "Administrative Reasons." Conditions 3, 4 and 5 will indicate to the foreign agent 135 that the hand-off of the mobile node 125 has been to second foreign network 150 with the same access type as foreign network 130, a different access type from foreign network 130, or for a handoff of an unknown reason, respectively. For conditions 1 through 6, certain resources will be revoked immediately, such as air access or air interface resources. Other network resources may be revoked immediately, and other network resources will be revoked by the foreign agent 135 based on its optimization analysis of how and when it is best to revoke the network resources. The optimization analysis conducted by the foreign agent 135 can be programmed individually for the particular foreign network 130 and its network resource availability, and that optimization analysis will depend on the type of condition indicated, the availability of network resources, the network resources currently being utilized, and any forecasts of network resource utilization in the future.

Condition 6 and 7 indicate to the foreign agent 135 that the hand-off is occurring per a peer connection policy between foreign networks 130 and 150, and whether the hand-off resource revocation includes revoking node local policies that previously supported communications with the mobile node 125. For conditions 6 and 7, certain resources will be revoked immediately, such as air access or air interface resources. Other network resources may be revoked immediately, and other network resources will be revoked by the foreign agent 135 based on its optimization analysis of how and when it is best to revoke the network resources. The optimization analysis conducted by the foreign agent 135 can be programmed individually for the particular foreign network 130 and its network resource availability, and that optimization analysis will depend on the type of condition indicated, the availability of network resources, the network resources currently being utilized, and any forecasts of network resource utilization in the future.

Condition 8 indicates that the revocation of resources by the foreign agent 135 should include termination of the User Initiated Session(s) resources, and Condition 9 indicates that the revocation of resources by the foreign agent 135 should include termination of the access network session resources. Condition 10 indicates that the foreign agent 135 should revoke resources related to the IPv4 HoA Lease in a Lease Expiration. For conditions 8 and 9, certain resources will be revoked immediately, such as air access or air interface resources. Other network resources may be revoked immediately, and other network resources will be revoked by the foreign agent 135 based on its optimization analysis of how and when it is best to revoke the network resources. The optimization analysis conducted by the foreign agent 135 can be programmed individually for the particular foreign network 130 and its network resource availability, and that optimization analysis will depend on the type of condition indicated, the availability of network resources, the network resources currently being utilized, and any forecasts of network resource utilization in the future.

Condition 11 indicates to the foreign agent 135 that a Possible Out-of Sync BCE State exists. If that "Out-of-Sync" condition exists, certain resources will be maintained for a predetermined period of time (e.g. remainder of lifetime) because a possibility may exist that the mobile node 125 will return to the foreign network 130 and be connected again to the foreign agent 135 within that period of time. As such, certain resources are not immediately revoked because those resources may be needed to support the connectivity to the mobile node 125 in that event. The optimization analysis conducted by the foreign agent 135 can be programmed individually for the particular foreign network 130 and its network resource availability, and that optimization analysis will depend on the type of condition indicated, the availability of network resources, the network resources currently being utilized, and any forecasts of network resource utilization in the future.

Condition 250-255 is expanded trigger information that is Reserved For Testing Purposes, and as such, can indicate a number of test conditions for use by the foreign agent 135 or other entities connected to the network. After the foreign agent 135 performs its optimization analysis and revokes the appropriate network resources, the foreign agent will transmit a binding revocation acknowledgement message to the local mobility anchor 113 to confirm the receipt of the revocation request and the actions taken by the foreign agent in compliance with the binding revocation request.

Figures 3, 4:
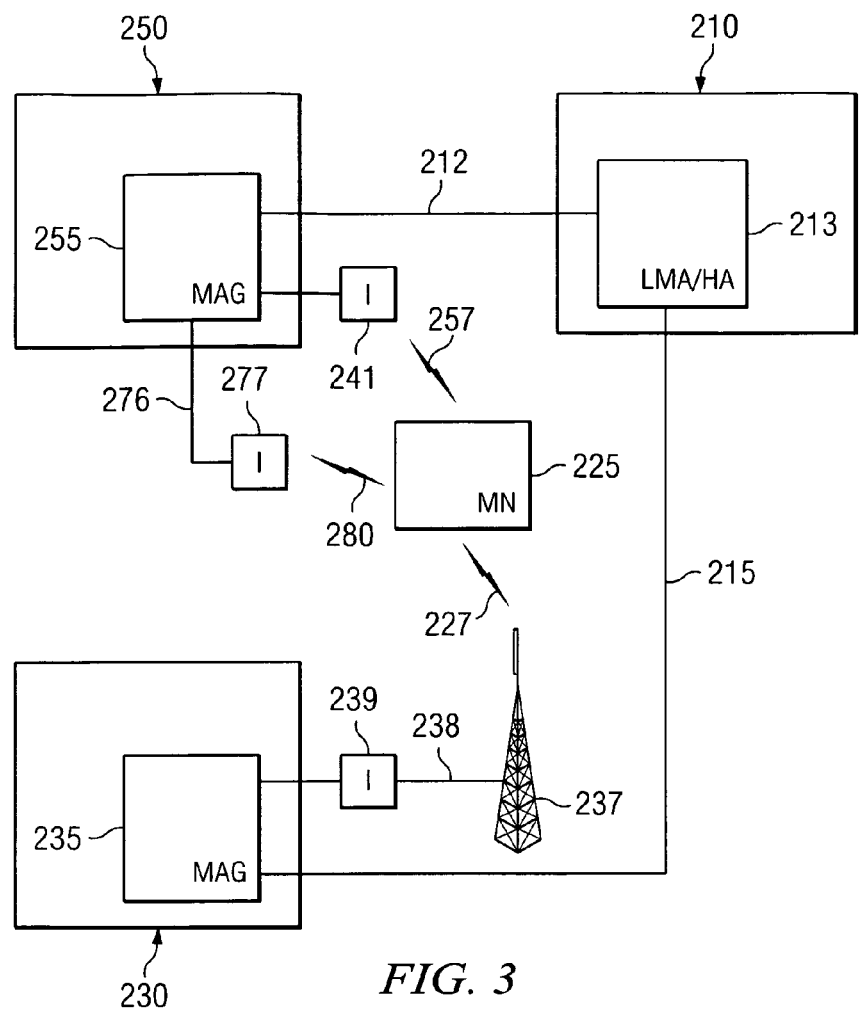
FIG. 3 is a mobile IP-based communication system as used in the present invention using proxy messages that specify access type and handover indicator fields.
FIG. 4 is a binding cache entry table that supports these entries for the system shown in FIG. 3.

In FIG. 3, the overall architecture of the IP-based mobile system is shown with a mobile mode 225, a home network 210 and foreign networks 230 and 250, respectively. As shown in FIG. 3, the home network 210 has a home agent or local mobility anchor 213. The local mobility anchor 213 is coupled to the mobility agent gateway 255 on foreign network 250 by communication link 212, and local mobility anchor 213 is coupled to the mobility agent gateway 235 on foreign network 230 by communication link 215.

The mobility agent gateway 235 is coupled to the mobile node 225 through the radio access system comprised of the base station transceiver 239 coupled to the antenna/transmitter 237 through the communication link 227. The mobility agent gateway 255 is coupled to a second access type, such as WiMax or WiFi, through interface 241 coupled to the mobile node 225 by communication link 257. FIG. 3 also shows a second connection of the same access type as supported by interface 241 for the connection of the mobile node 225 to foreign agent 255 through connection 276 and second access interface 277. This interface is connected to mobile node 225 through communication link 280.

Mobile node 225 is shown electronically coupled to the foreign networks 250 and 230 via the wireless communication link 257 (or 280) and 227, respectively. The mobile node 225, however, can communicate with any transceiver or access network coupled to a foreign network. That is, communications links 227, 280 and 257 are radio transmitted links, but these links can be composed of any connection between two or more nodes on a network or users on networks or administrative domains.

The terms Local Mobility Anchor, home agent, and foreign agent may be as defined in the Mobile IP Protocol (RFC 2002), but these agents are not restricted to a single protocol or system. In fact, the term home agent, as used in this application, can refer to a home mobility manager, home location register, home serving entity, or any other agent at a home network 210 having the responsibility to manage mobility-related functionality for a mobile node 225. Likewise, the term mobility agent gateway, as used in this application, can refer to a foreign agent, serving mobility manager, visited location register, visiting serving entity, or any other agent on a foreign network having the responsibility to manage mobility-related functionality for a mobile node 225.

In the mobile IP communications system shown in FIG. 3, the mobile node 225 is identified by a permanent IP address. While the mobile node 225 is coupled to its home network 210, the mobile node 225 receives information packets like any other fixed node on the home network 210. When mobile, the mobile node 225 can also locate itself on foreign network, such as network 230 or 250. When located on foreign network 230 or 250, the home network 210 sends data communications to the mobile node 225 by "tunneling" the communications to the foreign network 230 or 250.

The mobile node 225 keeps the local mobility anchor 213 informed of its current location, or foreign network association, by registering a care-of address with the local mobility anchor 213. Essentially, the care-of address represents the foreign network where the mobile node 225 is currently located. If the local mobility anchor 213 receives an information packet addressed to the mobile node 225 while the mobile node 225 is located on a foreign network 230, the local mobility anchor 213 will "tunnel" the information packet to foreign network 230 for subsequent transmission to mobile node 225.

The foreign agent 235 participates in informing the local mobility anchor 213 of the mobile node 225 current care-of address. The foreign agent 235 also receives information packets for the mobile node 225 after the information packets have been forwarded to the foreign agent 235 by the local mobility anchor 213. Moreover, the foreign agent 235 serves as a default router for out-going information packets generated by the mobile node 225 while connected to the foreign network 230.

The mobile node 225 participates in informing the local mobility anchor 213 of its current location and requests connections to the associated foreign network. When the mobile node 225 transitions to connecting to foreign network 250, the mobile node 213 obtains appropriate information regarding the address of the foreign network 250 and/or the foreign agent 255 from an agent advertisement.

When first connected to the local mobility anchor 213, mobile node 225 would have created an entry on the binding cache entry table in FIG. 4 that specified the mobile node identification for the first access type. The access type field of information is included in this binding cache entry table in FIG. 4, with the mobile node identification field. FIG. 4 is a binding cache entry table 260 that possesses at least column and row entries for the mobile node identification 265 and the access type 267.

In the system shown on FIG. 3, multiple access types on a single foreign network 250 are supported by multiple interfaces, such as interface 241 and 277. Because the correspondence of the same access type on the binding cache entry table of FIG. 4 may not indicate an inherent handover to a different foreign network from the prior connected foreign network, the proxy binding update request will include a handover indicator for the analysis by the local mobility anchor 213.

The handover indicator would include a new field in the transmission packet that would indicate a handover to the same access type on the same foreign network or a handover to a new foreign network. This information could also be indicated by a flag or other indicator to show the type of handover that will be initiated, e.g. flag "1" equals handover to same access type on same foreign network, flag "0" equals handover to different foreign network. The new field could also indicate if the handover status is unknown, or this is an initial request for a proxy binding update request. Other fields can be maintained on the binding cache entry table, and the transmission packets may be expanded to accommodate the new access type field of information.

The local mobility anchor 213 will check subsequent proxy binding update requests received from the mobile node 225 to determine the handover indicator status. If the handover indicator indicates that the mobile node is being connected to a different foreign network, the local mobility anchor 113 will initiate a protocol for a handover of the mobile node 225 to a new foreign network, such as a handover of mobile node 225 from foreign network 250 to foreign network 230. The local mobility anchor 213 will create a new binding cache entry for the mobile node, and the care-of addressing and home network prefix will be changed to designate the new foreign network as the network where the mobile node 225 can be located, which information will be transmitted to the proper mobility access gateway 235 and the mobile node 225.

If the handover indicator indicates that a handover is being requested to different access type connection for the mobile node 225 on the same foreign network 250, the local mobility anchor 213 will initiate a protocol for designating a home network prefix for the foreign network 250 where the mobile node 225 was previously located without any indication of a handover to a new foreign network. If that is the case, the entry for the mobile node 225 will be modified on the binding cache entry table to indicate that the mobile node 225 is still connected to the first foreign network 250, which information will be transmitted to the proper mobility access gateway 235 and the mobile node 225.

That is, this handover indicator may simply show the new connection for the mobile node 225 is to a new interface for the same access type on the same foreign network 250, as opposed to a handover to a new foreign network. If so, the local mobility anchor 213 will respond to the proxy binding update request with a proxy binding update response having a home network prefix indicator that points to the first foreign network 250. In this manner, a receipt of new proxy binding update request at the local mobility anchor 213 does not automatically create a new home network prefix for this mobile node, which solves some of the problems with determining whether a handover of the mobile node care-of addressing is necessary and whether it is necessary to designate a new foreign network or the same foreign network for this care-of addressing for the mobile node.

As an alternative embodiment that is covered by the scope of the invention, when first connected to the local mobility anchor 213, mobile node 225 would have created an entry on the binding cache entry table in FIG. 4 that specified the mobile node identification for the first access type and interface identification information. The access type field of information is included in this binding cache entry table in FIG. 4, with the mobile node identification field, and the interface identification information in column 269 would have indicated the specific interface information for interface 241 or 277. FIG. 4 is a binding cache entry table 260 that possesses at least column and row entries for the mobile node identification 265, the access type 267, and the interface 269.

In the system shown on FIG. 3, multiple access types on a single foreign network 250 are supported by multiple interfaces, such as interface 241 and 277. Because the correspondence of the same access type on the binding cache entry table of FIG. 4 would include additional information that the local mobility anchor would use to analyze whether the proxy binding update request relates to a handover to a different foreign network 230 from the prior connected foreign network 250 or a handover to a different interface for the same access type on the same foreign network 250.

In addition to the access type information and the handover indicator described above, the proxy binding update request would include a new field in the transmission packet that would identify the interface that will be used to connect the mobile node to the foreign network. The new field could also indicate if the interface identification is unknown. Other fields can be maintained on the binding cache entry table, and the transmission packets may be expanded to accommodate the new access type field of information.

The local mobility anchor 213 will check subsequent proxy binding update requests received from the mobile node 225 to determine the handover indicator status. If the access type, handover indicator and interface identification information indicates that the mobile node is being connected to a different foreign network, the local mobility anchor 113 will initiate a protocol for a handover of the mobile node 225 to a new foreign network, such as a handover of mobile node 225 from foreign network 250 to foreign network 230. The local mobility anchor 213 will create a new binding cache entry for the mobile node, and the care-of addressing and home network prefix will be changed to designate the new foreign network as the network where the mobile node 225 can be located, which information will be transmitted to the proper mobility access gateway 235 and the mobile node 225.

If the access type, handover indicator, and interface identification information indicates that a handover is being requested to different access type connection for the mobile node 225 on the same foreign network 250, the local mobility anchor 213 will initiate a protocol for designating a home network prefix for the foreign network 250 where the mobile node 225 was previously located without any indication of a handover to a new foreign network. If that is the case, the entry for the mobile node 225 will be modified on the binding cache entry table to indicate that the mobile node 225 is still connected to the first foreign network 250, which information will be transmitted to the proper mobility access gateway 235 and the mobile node 225.

That is, the access type, handover indicator, and interface information may simply show the new connection for the mobile node 225 is to a new interface for the same access type on the same foreign network 250, as opposed to a handover to a new foreign network. If so, the local mobility anchor 213 will respond to the proxy binding update request with a proxy binding update response having a home network prefix indicator that points to the first foreign network 250. In this manner, a receipt of new proxy binding update request at the local mobility anchor 213 does not automatically create a new home network prefix for this mobile node, which solves some of the problems with determining whether a handover of the mobile node care-of addressing is necessary and whether it is necessary to designate a new foreign network or the same foreign network for this care-of addressing for the mobile node.

The local mobility anchor also sends a proxy binding revocation message to the former foreign agent 235 on foreign network 230 with expanded trigger field information. The proxy binding revocation message instructs the foreign agent to revoke network resources previously dedicated to support the connectivity from the foreign agent 235 to the mobile node 225. As part of the present invention, the expanded trigger field information provides explanation information to the foreign agent 235 so the foreign agent 235 can determine whether it is appropriate to accept or reject the revocation request, and if so what resources need to be revoke, when these resources need to be revoked, and how the resources are revoked.

First, the foreign agent 235 will determine if the mobile node is still connected to foreign network 230, and if so, the foreign agent will respond to the revocation request with a rejection response to the local mobility anchor 213. Other conditions may also prompt a rejection response by the foreign agent 235. After receipt of the binding revocation request with expanded trigger information and after confirmation that it is proper to revoke resources previously dedicated to the mobile node 225, the foreign agent 235 will analyze the expanded trigger information to determine what network resources need to be revoked immediately, maintained for a predetermined period of time, or maintained indefinitely. The expanded trigger information in the proxy binding revocation request can be set to the following conditions, which includes information useful for the foreign agent 235 to perform its revocation of resources.

1 Unspecified
    2 Administrative Reason
    3 Inter-MAG Handoff—same Access Types
    4 Inter-MAG Handoff—different Access Types
    5 Inter-MAG—Unknown Handoff
    6 Per-Peer Policy
    7 Revoking Node Local Policy
    8 User Initiated Session(s) Termination
    9 Access Network Session(s) Termination
    10 IPv4 HoA Lease Expires
    11 Possible Out-of Sync BCE State
    250-255 Reserved For Testing Purposes only These conditions and expanded trigger information found in the revocation request are used by the foreign agent 235 to optimize the revocation of resources supported on the foreign network 230. Condition 1 is unspecified and will provide the foreign agent 235 with sufficient information to revoke resources in an "unspecified" handover or default procedure. Condition 2 indicates to the foreign agent 235 that the cause of the revocation request from the local mobility anchor 213 to the foreign agent 235 is for "Administrative Reasons." Conditions 3, 4 and 5 will indicate to the foreign agent 235 that the hand-off of the mobile node 225 has been to second foreign network 250 with the same access type as foreign network 230, a different access type from foreign network 230, or for a handoff of an unknown reason, respectively. For conditions 1 through 6, certain resources will be revoked immediately, such as air access or air interface resources. Other network resources may be revoked immediately, and other network resources will be revoked by the foreign agent 235 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 6 and 7 indicate to the foreign agent 235 that the hand-off is occurring per a peer connection policy between foreign networks 230 and 250, and whether the hand-off resource revocation includes revoking node local policies that previously supported communications with the mobile node 225. For conditions 6 and 7, certain resources will be revoked immediately, such as air access or air interface resources. Other network resources may be revoked immediately, and other network resources will be revoked by the foreign agent 235 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 8 indicates that the revocation of resources by the foreign agent 235 should include termination of the User Initiated Session(s) resources, and Condition 9 indicates that the revocation of resources by the foreign agent 235 should include termination of the access network session resources. Condition 10 indicates that the foreign agent 235 should revoke resources related to the IPv4 HoA Lease in a Lease Expiration. For conditions 8 and 9, certain resources will be revoked immediately, such as air access or air interface resources. Other network resources may be revoked immediately, and other network resources will be revoked by the foreign agent 235 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 11 indicates to the foreign agent 235 that a Possible Out-of Sync BCE State exists. If that "Out-of-Sync" condition exists, certain resources will be maintained for a predetermined period of time (e.g. remainder of lifetime) because a possibility may exist that the mobile node 225 will return to the foreign network 230 and be connected again to the foreign agent 235 within that period of time. As such, certain resources are not immediately revoked because those resources may be needed to support the connectivity to the mobile node 225 in that event. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 250-255 is expanded trigger information that is Reserved For Testing Purposes, and as such, can indicate a number of test conditions for use by the foreign agent 235 or other entities connected to the network. After the foreign agent 235 performs its optimization analysis and revokes the appropriate network resources, the foreign agent will transmit a binding revocation acknowledgement message to the local mobility anchor 213 to confirm the receipt of the revocation request and the actions taken by the foreign agent in compliance with the binding revocation request.

Figure 5:
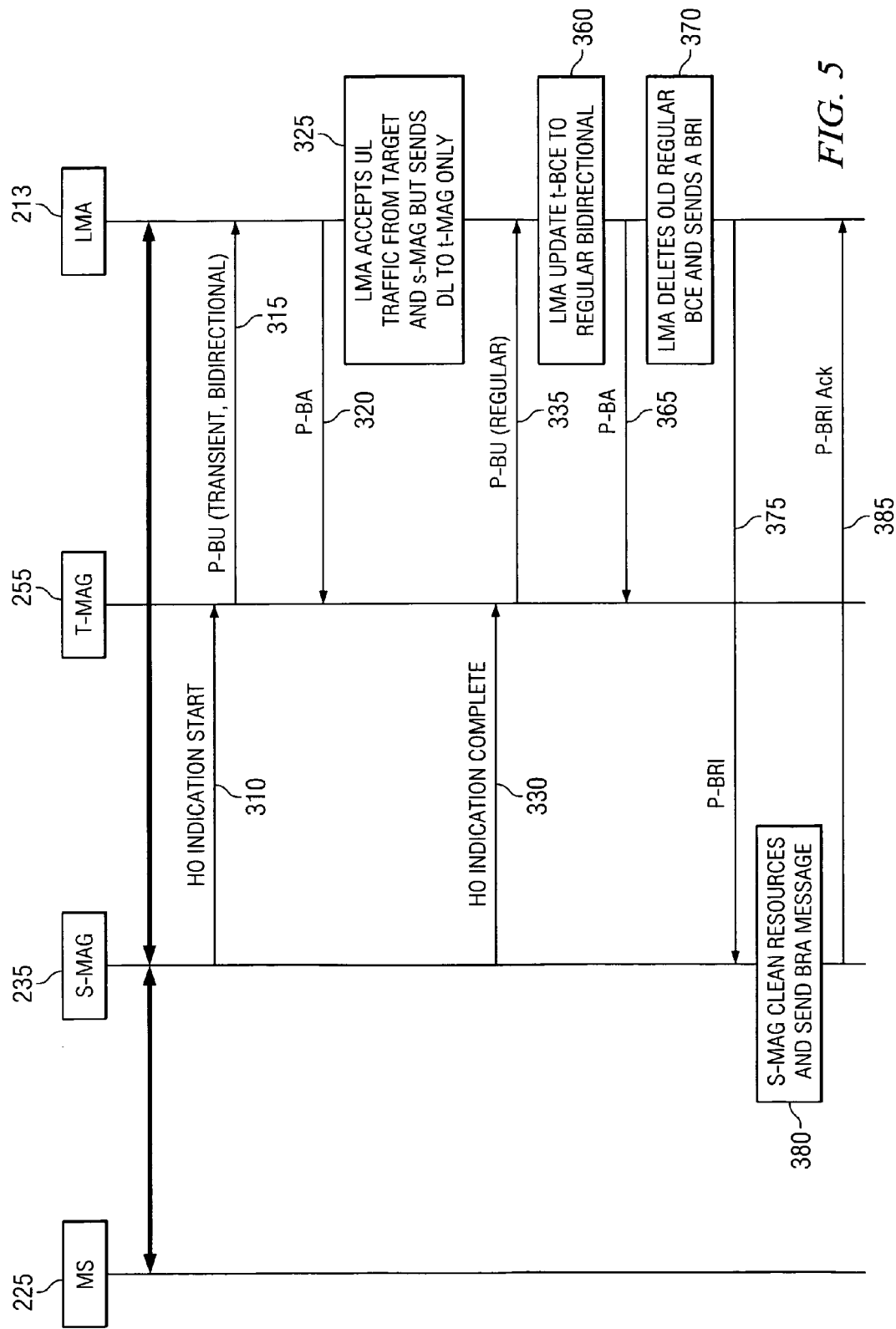
FIG. 5 shows a call flow diagram using the transient binding update messages and the expanded binding revocation trigger messages.

FIG. 5 shows the call flow for use in the first and second embodiments described above, but for the purposes of describing the call flow in FIG. 5, the reference numerals from FIG. 3 will be used to designate the mobile node 225, foreign agent 235, foreign agent 255 and local mobility anchor 213. In step 310, a handover indicator message is transmitted from the foreign agent 235 to foreign agent 255, and in step 315, the proxy binding update message with a transient message indicator and communication flow indicator will be sent from foreign agent 255 to the local mobility anchor 213. A proxy binding acknowledge transient message will be sent from the local mobility anchor 213 to the foreign agent 255 in step 320.

The local mobility anchor will accept all uplink traffic from the foreign agents 235 and 255, but will send only down-link traffic to the foreign agent 255 during the transition period. A binding cache entry on the binding cache entry table will be updated in step 325 to provide information on the foreign agent 255 as the new care-of address for the mobile node 225 during the transition period. The access type will be checked by the local mobility anchor, and the appropriate signal will be sent to the foreign agent 235 and/or 255 depending on the type of handover requested, whether it be same access type, different access type, or unknown.

When the handover is completed as determined by the foreign agent 235, a handover complete indicator message is sent from the foreign agent 235 to foreign agent 255 in step 330. The foreign agent 255 sends the local mobility anchor 213 a proxy binding update request to establish the foreign agent 255 as the care-of connection to the mobile node 225 for the purposes of bidirectional communications. The local mobility anchor updates its binding cache entry table to indicate that bidirectional (uplink and downlink) communications should be sent to the mobile node 225 through foreign agent 255 in step 360. The local mobility anchor 213 will then transmit a proxy binding acknowledge message to the foreign agent 255 in step 365, and subsequently, the local mobility anchor will delete the entries for the mobile node 225 on the binding cache entry table that associate the mobile node 225 connection with foreign agent 235 in step 370.

The local mobility anchor 213 will send a proxy binding revocation indicator message with expanded trigger field information to the foreign agent 235 at step 375. The proxy binding revocation message sent at step 375 instructs the foreign agent to revoke network resources previously dedicated to support the connectivity from the foreign agent 235 to the mobile node 225. As part of the present invention, the expanded trigger field information provides explanation information to the foreign agent 235 so the foreign agent 235 can determine whether it is appropriate to accept or reject the revocation request, and if so what resources need to be revoke, when these resources need to be revoked, and how the resources are revoked.

At step 380, the foreign agent 235 will determine if the mobile node is still connected to foreign network 230, and if so, the foreign agent will respond to the revocation request with a rejection response to the local mobility anchor 213. Other conditions may also prompt a rejection response by the foreign agent 235. After receipt of the binding revocation request with expanded trigger information and after confirmation that it is proper to revoke resources previously dedicated to the mobile node 225, the foreign agent 235 will analyze the expanded trigger information to determine what network resources need to be revoked immediately, maintained for a predetermined period of time, or maintained indefinitely. The expanded trigger information in the proxy binding revocation request can be set to the following conditions, which includes information useful for the foreign agent 235 to perform its revocation of resources.

1 Unspecified
2 Administrative Reason
3 Inter-MAG Handoff—same Access Types
4 Inter-MAG Handoff—different Access Types
5 Inter-MAG—Unknown Handoff
6 Per-Peer Policy
7 Revoking Node Local Policy
8 User Initiated Session(s) Termination
9 Access Network Session(s) Termination
10 IPv4 HoA Lease Expires
11 Possible Out-of Sync BCE State 250-255 Reserved For Testing Purposes only These conditions and expanded trigger information found in the revocation request are used by the foreign agent 235 to optimize the revocation of resources supported on the foreign network 230. Condition 1 is unspecified and will provide the foreign agent 235 with sufficient information to revoke resources in an "unspecified" handover or default procedure. Condition 2 indicates to the foreign agent 235 that the cause of the revocation request from the local mobility anchor 213 to the foreign agent 235 is for "Administrative Reasons." Conditions 3, 4 and 5 will indicate to the foreign agent 235 that the hand-off of the mobile node 225 has been to second foreign network 250 with the same access type as foreign network 230, a different access type from foreign network 230, or for a handoff of an unknown reason, respectively. For conditions 1 through 6, certain resources will be revoked immediately, such as air access or air interface resources. Other network resources may be revoked immediately, and other network resources will be revoked by the foreign agent 225 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 6 and 7 indicate to the foreign agent 235 that the hand-off is occurring per a peer connection policy between foreign networks 230 and 250, and whether the hand-off resource revocation includes revoking node local policies that previously supported communications with the mobile node 225. For conditions 6 and 7, certain resources will be revoked immediately, such as air access or air interface resources. Other network resources may be revoked immediately, and other network resources will be revoked by the foreign agent 235 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 8 indicates that the revocation of resources by the foreign agent 235 should include termination of the User Initiated Session(s) resources, and Condition 9 indicates that the revocation of resources by the foreign agent 235 should include termination of the access network session resources. Condition 10 indicates that the foreign agent 235 should revoke resources related to the IPv4 HoA Lease in a Lease Expiration. For conditions 8 and 9, certain resources will be revoked immediately, such as air access or air interface resources. Other network resources may be revoked immediately, and other network resources will be revoked by the foreign agent 235 based on its optimization analysis of how and when it is best to revoke the network resources. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 11 indicates to the foreign agent 235 that a Possible Out-of Sync BCE State exists. If that "Out-of-Sync" condition exists, certain resources will be maintained for a predetermined period of time (e.g. remainder of lifetime) because a possibility may exist that the mobile node 225 will return to the foreign network 230 and be connected again to the foreign agent 235 within that period of time. As such, certain resources are not immediately revoked because those resources may be needed to support the connectivity to the mobile node 225 in that event. The optimization analysis conducted by the foreign agent 235 can be programmed individually for the particular foreign network 230 and its network resource availability, and that optimization analysis will depend on the type of condition indicated, the availability of network resources, the network resources currently being utilized, and any forecasts of network resource utilization in the future.

Condition 250-255 is expanded trigger information that is Reserved For Testing Purposes, and as such, can indicate a number of test conditions for use by the foreign agent 235 or other entities connected to the network. After the foreign agent 235 performs its optimization analysis and revokes the appropriate network resources, the foreign agent will transmit a binding revocation acknowledgement message to the local mobility anchor 213 at step 385 to confirm the receipt of the revocation request and the actions taken by the foreign agent in compliance with the binding revocation request.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, we claim:
1. A method for registration of a mobile node comprising:
receiving a registration request message at a local mobility anchor relating to the mobile node connected to a first foreign network, the registration request message including a mobile node identifier, an access type identifier that indicates a communication access type used to connect to the mobile node, a handover indicator that specifies whether the registration request message is associated with a handover to a new access type on the first foreign network or a handover to a second foreign network, and an interface identifier that indicates a specific access interface being used to connect to the mobile node;
creating an entry on a cache entry table depending on a comparison of the information received in the registration request message against information on the cache entry table associated with the local mobility anchor and whether the handover to the second foreign network is detected or the handover to the new access type on the first foreign network is detected;
transmitting a registration response from the local mobility anchor with a network prefix depending on whether the handover to the second foreign network is detected or the handover to a new access type on the first foreign network is detected; and
transmitting a revocation request message from the local mobility anchor to a mobile access gateway on the first foreign network with an expanded trigger information field to be used by the mobile access gateway to determine if network resources allocated to the mobile node should be revoked and if so, the manner of revoking the network resources that supported connectivity to the mobile node.

2. The method of registration in claim 1 wherein the local mobility anchor detects the handover to the second foreign network in accordance with registration request information including the access type identifier, where only one access type per interface is supported on the second foreign network.

3. The method of registration in claim 1 wherein the local mobility anchor detects the handover to the second foreign network in accordance with registration request information including the access type identifier where more than one interface supports the same access type on the second foreign network.

4. The method of registration in claim 1 wherein the local mobility anchor detects the handover to the new access type on the first foreign network in accordance with registration request information including the interface identification and handover indicator where more than one interface supports the same access type on the first foreign network.

5. The method in claim 1 wherein the expanded trigger information field is used to determine which network resources should be revoked immediately.

6. The method in claim 1 wherein the expanded trigger information field is used to determine which network resources should be maintained for a predetermined period of time.

7. The method in claim 1 wherein expanded trigger information field is used to determine which network resources should be maintained until it is determined if the mobile node will attempt to reconnect to said mobile access gateway.

8. A method for registration of a mobile node comprising:
receiving a registration request message at a local mobility anchor relating to the mobile node on a first foreign network, said registration request message including a mobile node identifier, an access type identifier that indicates a communication access type used to connect the mobile node, a handover indicator that specifies whether the new registration request is associated with a handover to a new access type on the first foreign network or a handover to a second foreign network, and an interface identifier that indicates a specific access interface being used to connect the mobile node;
transmitting a registration response from the local mobility anchor with a network prefix based on a comparison of the information received in the registration request message against information on a cache entry table associated with the local mobility anchor and depending on whether the handover to the second foreign network is detected or handover to new access type on said foreign network is detected;
transmitting a revocation request message from the local mobility anchor to a mobile access gateway on the first foreign network with an expanded trigger information field to be used by the mobile access gateway to determine if network resources allocated to the mobile node should be revoked and if so, the manner of revoking the network resources that supported connectivity to the mobile node.

9. The method in claim 8 wherein the expanded trigger information field is used to determine which network resources should be revoked immediately.

10. The method in claim 8 wherein the expanded trigger information field is used to determine which network resources should be maintained for a predetermined period of time.

11. The method in claim 8 wherein the expanded trigger information field is used to determine which network resources should be maintained until it is determined if the mobile node will attempt to reconnect to the mobile access gateway.

12. The method in claim 8 further comprising the step of:
creating an entry on the cache entry table depending on whether the handover to the second foreign network is detected or the handover to the access type on the first foreign network is detected.

13. The method of registration in claim 12 wherein the cache entry table includes information relating to the mobile node connected to the first foreign network, including the mobile node identification information and the access type used to connect the mobile node to the first foreign network.

14. The method in claim 12 wherein the expanded trigger information field is used to determine which network resources should be revoked immediately.

15. The method in claim 12 wherein the expanded trigger information field is used to determine which network resources should be maintained for a predetermined period of time.

16. The method in claim 12 wherein the expanded trigger information field is used to determine which network resources should be maintained until it is determined if the mobile node will attempt to reconnect to the mobile access gateway.

17. A communications network comprising:
a home network having a local mobility agent coupled to one or more foreign networks, each foreign network having a mobile access gateway that is connected to one or more mobile nodes;
the local mobility agent having a cache entry table to maintain information relating to said one or more mobile nodes connected to said each foreign network;
said local mobility agent configured to provide information for mobile node connectivity in response to a registration request message received by the local mobility agent based on a comparison of information received in the registration request message against the information on the cache entry table, said registration request message including a mobile node identifier, an access type identifier that indicates a communication access type used to connect the mobile node to at least one of the one or more foreign networks, a handover indicator that specifies whether the registration request message is associated with a handover to a new access type on a first foreign network to which one of the one or more mobile nodes is connected or a handover to a new foreign network, and an interface identifier that indicates a specific access interface being used to connect the mobile node to the one or more foreign networks, and
said local mobility agent transmitting a revocation request message to a mobile access gateway on the first foreign network with an expanded trigger information field to be used by the mobile access gateway to determine if network resources allocated to the mobile node should be revoked and if so, the manner of revoking the network resources that supported connectivity to the mobile node.

18. The communications network in claim 17 wherein the expanded trigger information field is used to determine which network resources should be revoked immediately.

19. The communications network in claim 17 wherein the expanded trigger information field is used to determine which network resources should be maintained for a predetermined period of time.

20. The communications network in claim 17 wherein the expanded trigger information field is used to determine which network resources should be maintained until it is determined if the mobile node will attempt to reconnect to said mobile access gateway.

* * * * *